United States Patent
Utsunomiya

(10) Patent No.: US 9,965,180 B2
(45) Date of Patent: May 8, 2018

(54) INFORMATION PROCESSING APPARATUS, INFORMATION PROCESSING APPARATUS CONTROL METHOD, AND STORAGE MEDIUM

(71) Applicant: CANON KABUSHIKI KAISHA, Tokyo (JP)

(72) Inventor: Takehito Utsunomiya, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/131,599

(22) Filed: Apr. 18, 2016

(65) Prior Publication Data

US 2016/0316079 A1    Oct. 27, 2016

(30) Foreign Application Priority Data

Apr. 23, 2015 (JP) ................. 2015-088800

(51) Int. Cl.
| | |
|---|---|
| *G06F 3/041* | (2006.01) |
| *G06F 3/0488* | (2013.01) |
| *H04N 1/44* | (2006.01) |
| *G06F 3/12* | (2006.01) |

(52) U.S. Cl.
CPC ....... *G06F 3/04886* (2013.01); *H04N 1/4426* (2013.01); *G06F 3/1201* (2013.01)

(58) Field of Classification Search
CPC .... G06F 3/041; G06F 3/04886; H04N 1/4426
See application file for complete search history.

(56) References Cited

U.S. PATENT DOCUMENTS

| | | | |
|---|---|---|---|
| 2012/0113007 A1* | 5/2012 | Koch .................... | G06F 3/0488 345/168 |
| 2015/0046864 A1* | 2/2015 | Fujii ................... | G06F 3/04842 715/771 |

FOREIGN PATENT DOCUMENTS

JP    6-309092 A    11/1994

\* cited by examiner

*Primary Examiner* — Insa Sadio
(74) *Attorney, Agent, or Firm* — Canon U.S.A., Inc. IP Division

(57) ABSTRACT

An information processing apparatus includes a first control unit configured to control an operation to be performed by the information processing apparatus and a second control unit configured to control an operation of an operation unit equipped with a display device. The first control unit generates first graphic data corresponding to a screen to be displayed by the display device. The second control unit generates second graphic data corresponding to a software key. Further, the information processing apparatus combines the first graphic data with the second graphic data to form composite graphic data and causes the display device to display the composite graphic data.

12 Claims, 12 Drawing Sheets

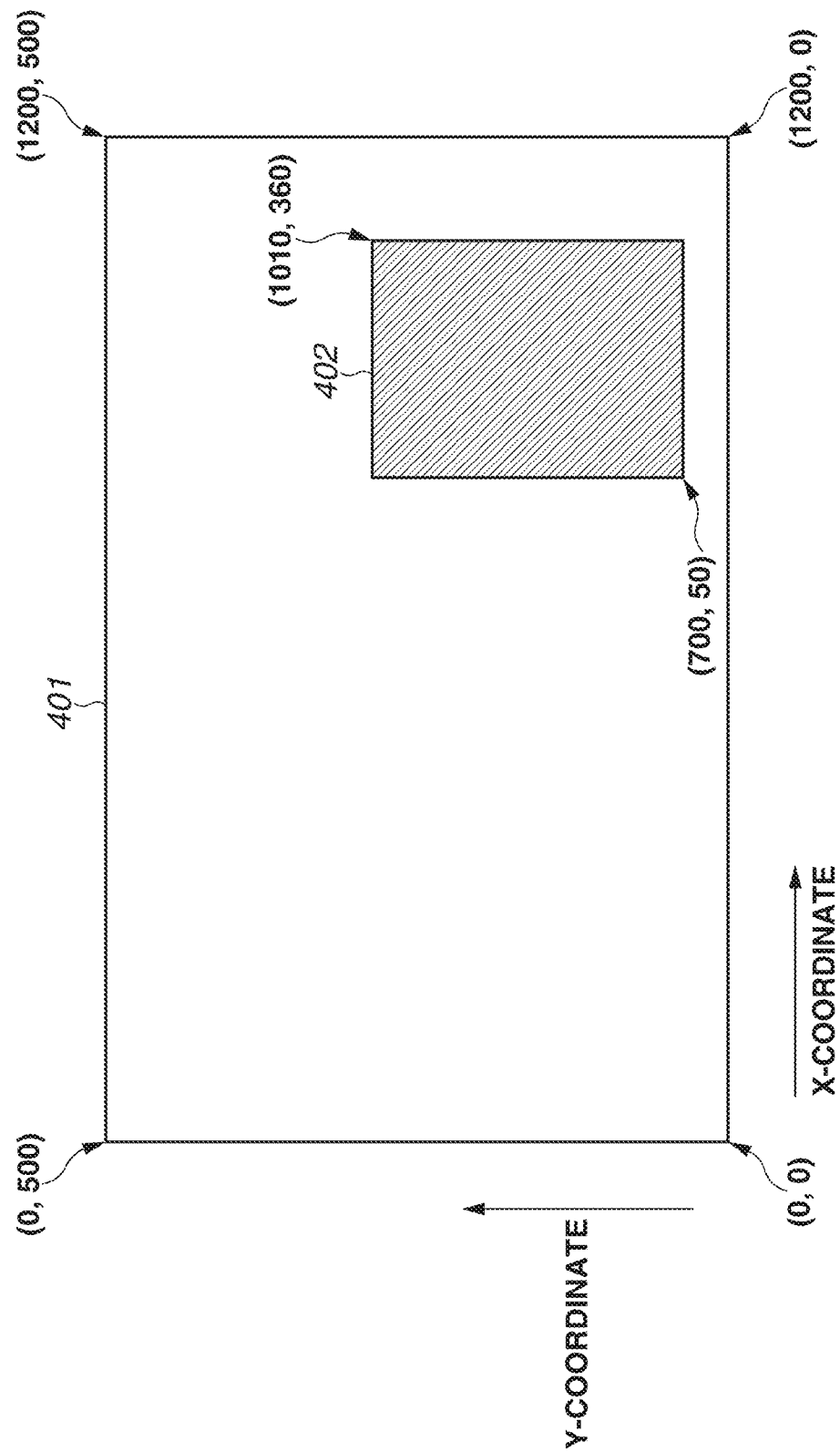

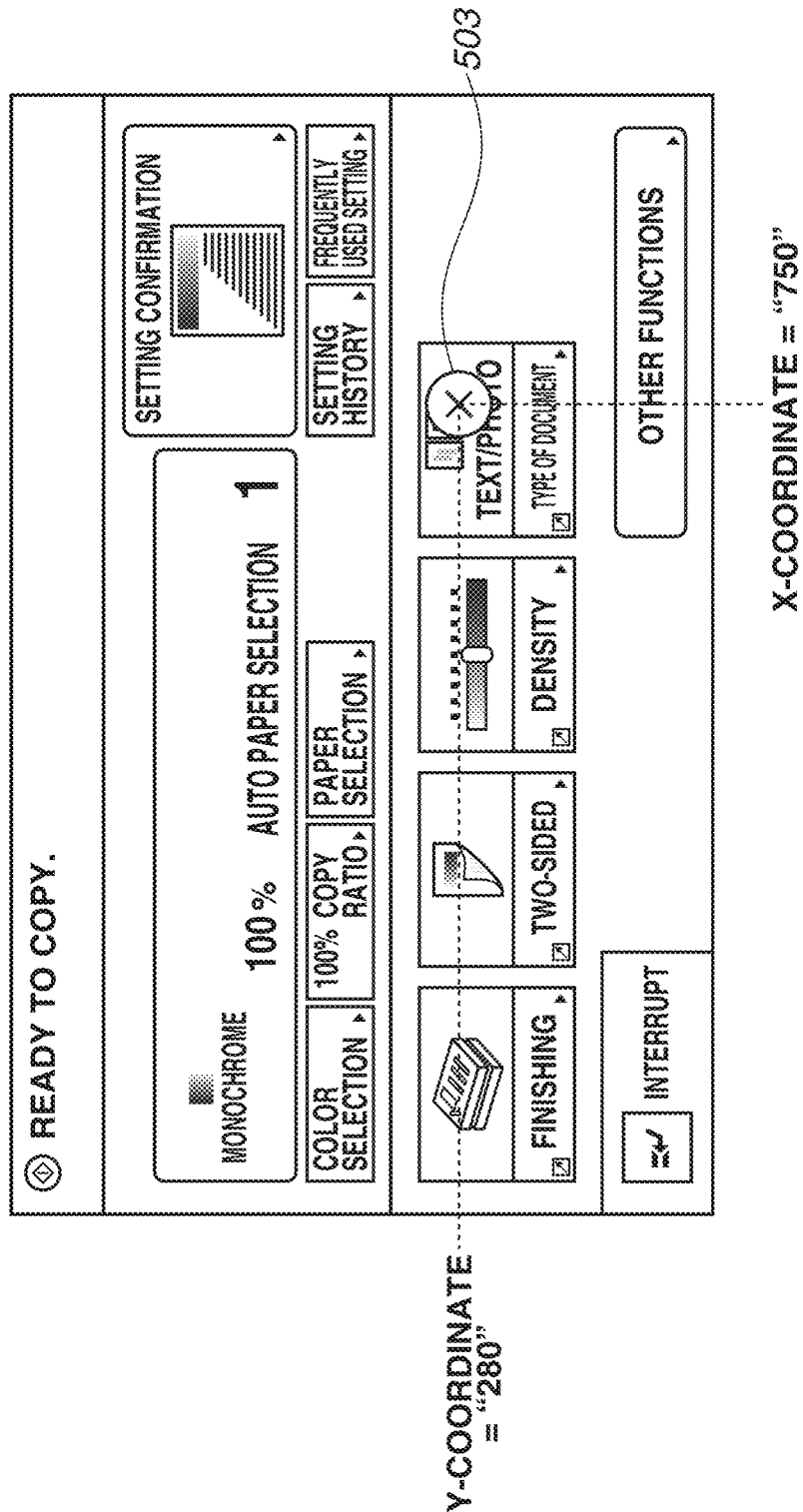

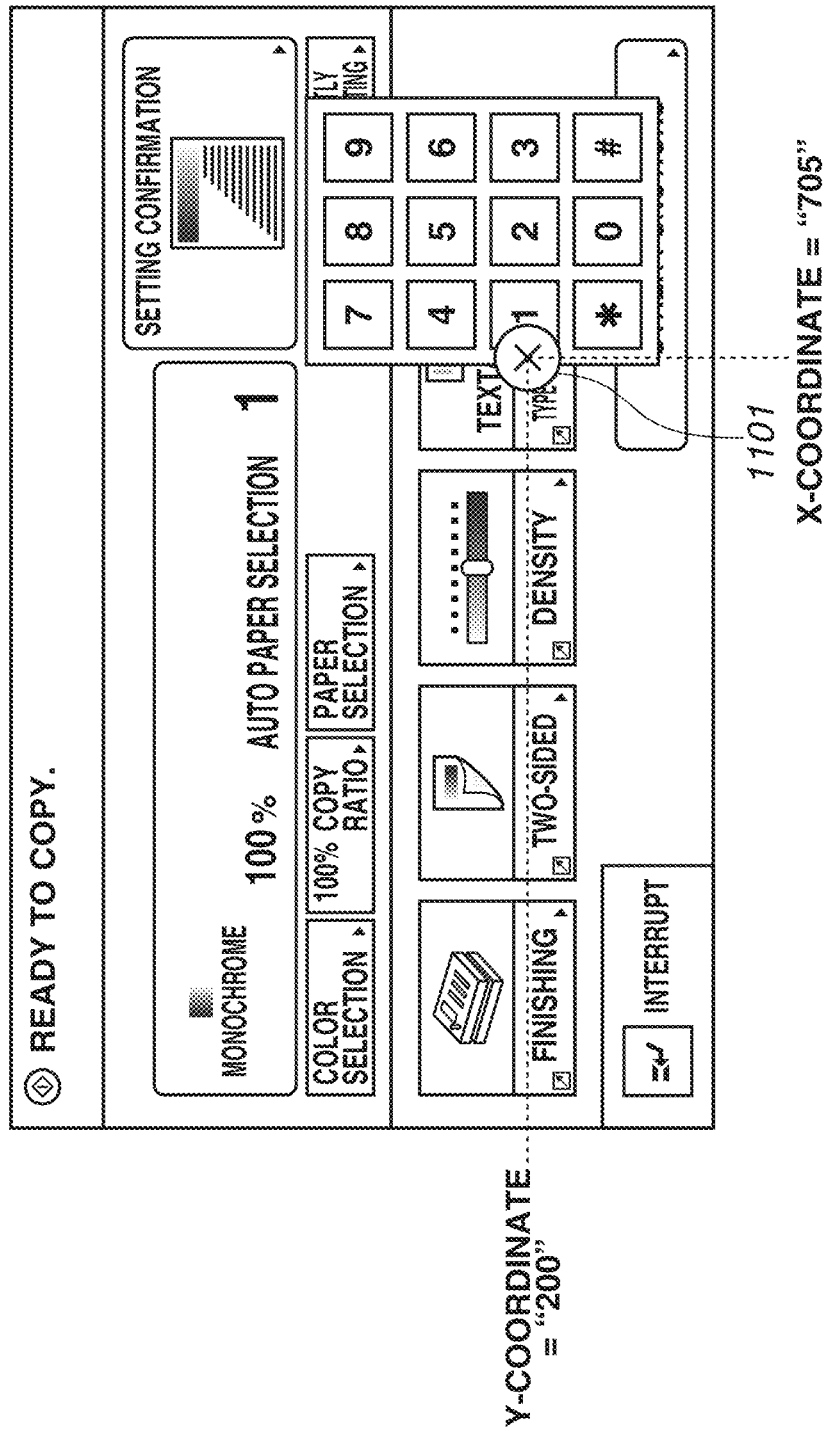

FIG.6

| GRAPHIC CHARACTER | START POINT COORDINATES | | END POINT COORDINATES | | ASCII CODE (HEX) |
|---|---|---|---|---|---|
| | X-COORDINATE | Y-COORDINATE | X-COORDINATE | Y-COORDINATE | |
| * | 710 | 60 | 800 | 150 | 0x2A |
| 0 | 810 | 60 | 900 | 150 | 0x30 |
| # | 910 | 60 | 1000 | 150 | 0x23 |
| 1 | 710 | 160 | 800 | 250 | 0x31 |
| 2 | 810 | 160 | 900 | 250 | 0x32 |
| 3 | 910 | 160 | 1000 | 250 | 0x33 |
| 4 | 710 | 260 | 800 | 350 | 0x34 |
| 5 | 810 | 260 | 900 | 350 | 0x35 |
| 6 | 910 | 260 | 1000 | 350 | 0x36 |
| 7 | 710 | 360 | 800 | 450 | 0x37 |
| 8 | 810 | 360 | 900 | 450 | 0x38 |
| 9 | 910 | 360 | 1000 | 450 | 0x39 |

INFORMATION PROCESSING APPARATUS, INFORMATION PROCESSING APPARATUS CONTROL METHOD, AND STORAGE MEDIUM

BACKGROUND OF THE INVENTION

Field of the Invention

The present invention relates to an information processing apparatus that includes an operation unit equipped with a display device, a method for controlling the information processing apparatus, and a storage medium.

Description of the Related Art

A recent image processing apparatus having a scan function and a print function is generally equipped with a touch panel, in addition to hardware keys (e.g., numeric keys), as an operation unit configured to receive a user operation. The numeric keys include numeric keys from 0 to 9 and symbol keys, such as * and #.

Hereinafter, an example of processing that is performed by a main body controller 100 and an operation unit 150 in such an image processing apparatus will be described in detail below with reference to FIG. 9. In a case where a user operates hardware numeric keys 901 or a touch panel 152, input information is transmitted to an operation unit central processing unit (CPU) 151. The operation unit CPU 151 acquires necessary information based on the input information transmitted from the hardware numeric keys 901 or the touch panel 152. Then, the operation unit CPU 151 transmits the acquired information to a main body CPU 101. For example, in a case where the user presses any one of the hardware numeric keys 901 (e.g., a key having the number 3), character information corresponding to the pressed key is transmitted to the main body CPU 101. Further, in a case where the user performs a touch operation on the touch panel 152, coordinate information representing a touched position is transmitted to the main body CPU 101.

The main body CPU 101 identifies a screen to be displayed by a display device 153 based on the information transmitted from the operation unit CPU 151, and generates graphic data 902 corresponding to the identified screen and transmits the generated data to the display device 153. The main body controller 100 stores, beforehand, various types of information (including texts and images) that is necessary to generate graphic data corresponding to each of a plurality of screens to be displayed on the display device 153. The main body CPU 101 generates necessary graphic data based on the above-mentioned information. The display device 153 displays a screen based on the transmitted graphic data 902. Through the above-mentioned processing, an intended screen can be displayed on the display device 153 according to a user operation via the hardware numeric keys 901 or the touch panel 152.

On the other hand, eliminating the hardware keys is desirable to realize cost reduction based on downsizing of the operation unit and improve the design of an image processing apparatus. To this end, enabling a user to perform every input operation with the touch panel is essentially required.

In this case, the image processing apparatus can be configured to display software keys, as a substitute for the numeric keys provided as hardware keys, on the display device to receive an input from a user via the touch panel.

However, to cause the display device to display the software keys, the main body CPU is required to generate graphic data appropriately changed. To this end, it is necessary to change or modify the configuration of the main body controller. The costs will increase greatly.

SUMMARY OF THE INVENTION

According to an aspect of the present invention, a method is provided of displaying software keys comparable to hardware keys on a display device without a great change in a configuration of a main body controller that controls an information processing apparatus.

According to another aspect of the present invention, an information processing apparatus includes an operation unit equipped with a display device, a first control unit configured to control an operation of the information processing apparatus and generate first graphic data corresponding to a screen to be displayed by the display device, a second control unit configured to control an operation of the operation unit and generate second graphic data corresponding to a software key, and a display control unit configured to combine the first graphic data generated by the first control unit with the second graphic data generated by the second control unit to form composite graphic data and to cause the display device to display the composite graphic data.

Further features of the present invention will become apparent from the following description of exemplary embodiments with reference to the attached drawings.

BRIEF DESCRIPTION OF THE DRAWINGS

FIG. 4 is a diagram illustrating a coordinate system that defines coordinate information about the touch panel and a display device.

FIGS. 5A, 5B, 5C, and 5D are diagrams each illustrating a position touched by a user on a screen displayed by the display device.

FIG. 6 is a table illustrating a correspondence relationship between a display position of each software numeric key and character information corresponding to each key.

DESCRIPTION OF THE EMBODIMENTS

Exemplary embodiments of the present invention will be described in detail below with reference to the attached drawings. The intent to describe the following exemplary embodiments is not narrowly interpreting the invention defined by the claims. Further, it should be noted that possible combinations of the features described in the following exemplary embodiments are not always necessary as constituent elements of the present invention.

Figure 1:
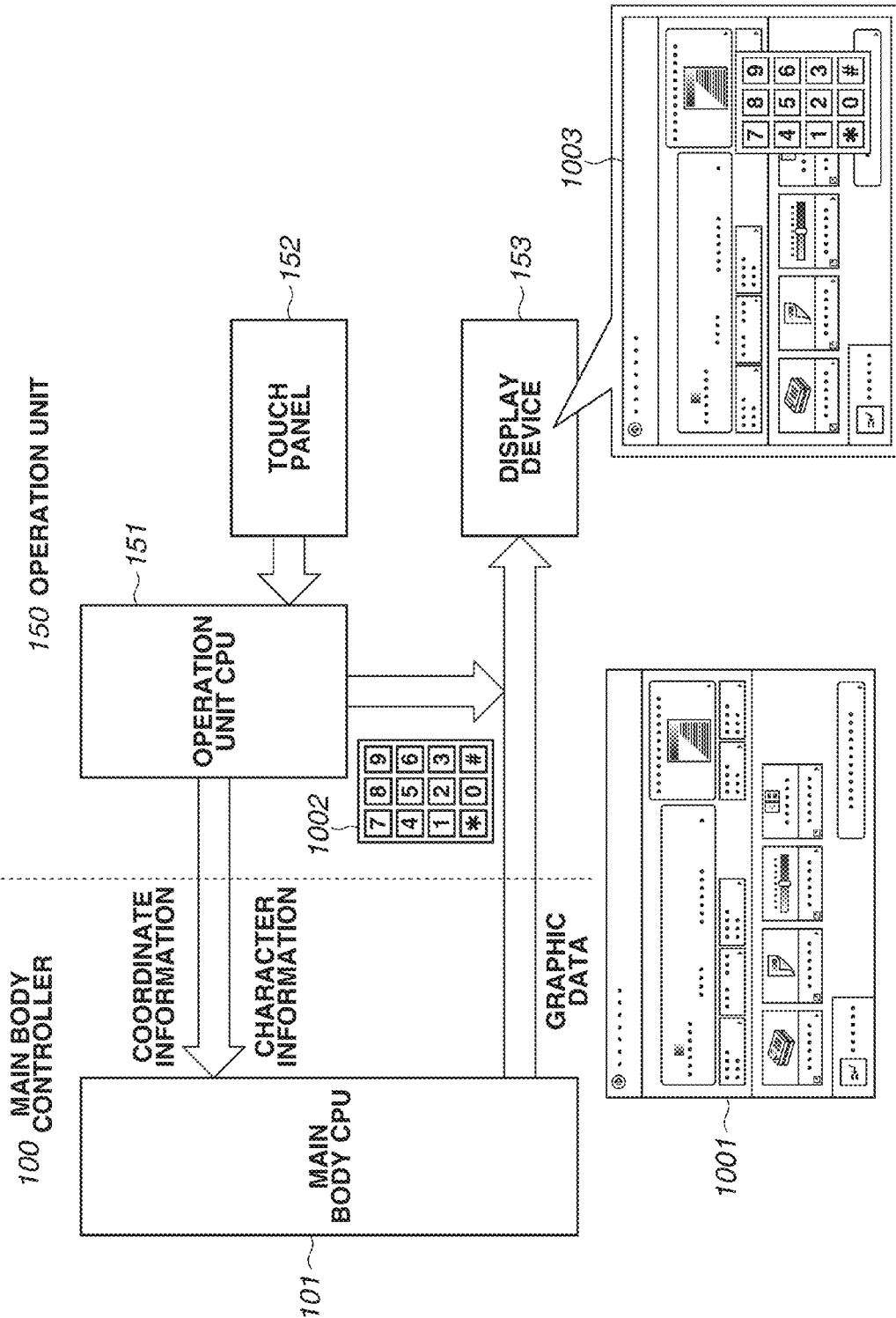
FIG. 1 is a diagram schematically illustrating an example of processing that is performed by a main body controller and an operation unit of an image processing apparatus.
Figure 9:
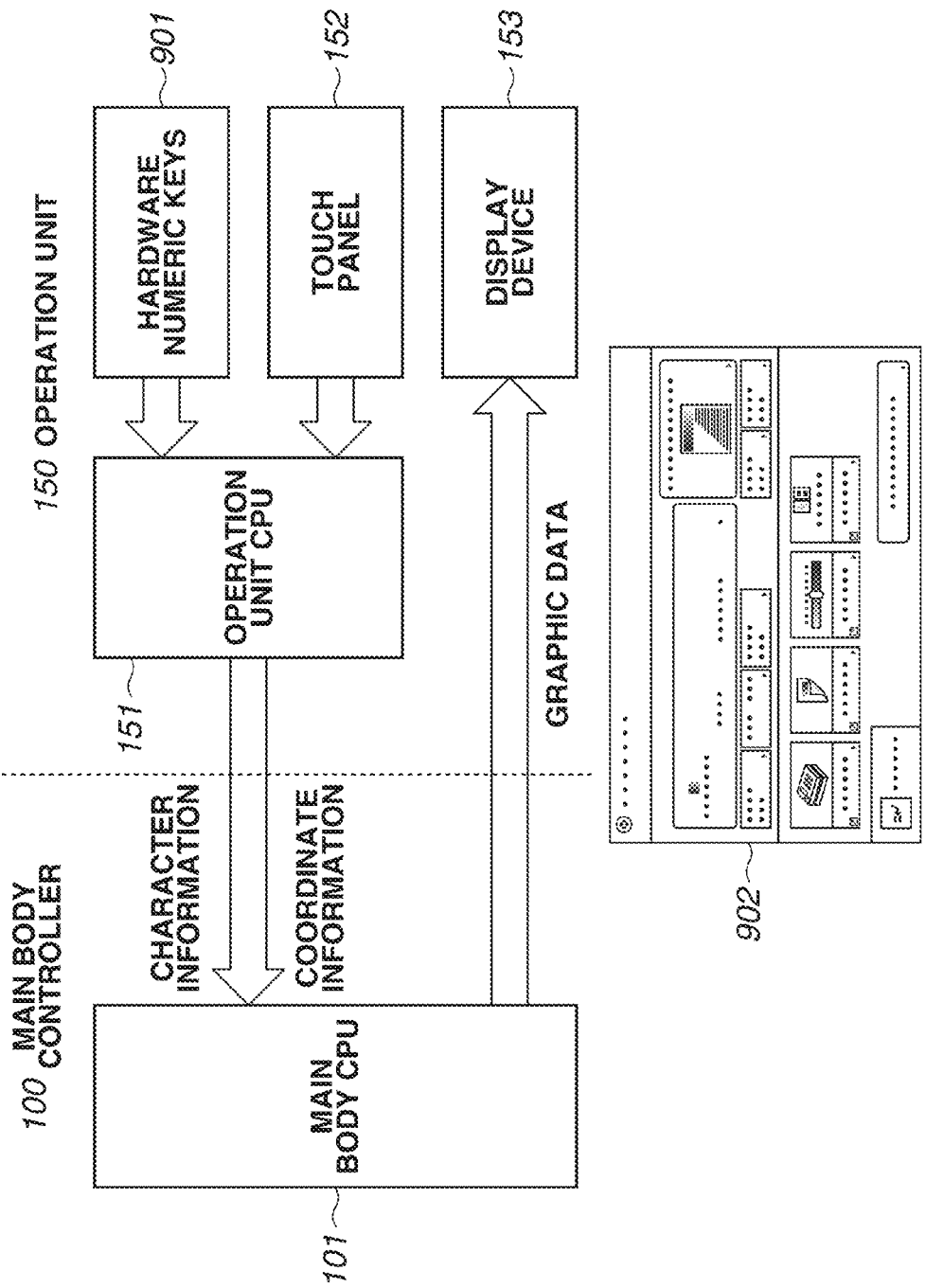
FIG. 9 is a diagram schematically illustrating an example of processing that is performed by a main body controller and an operation unit of a conventional image processing apparatus.

Processing that is performed by the main body controller 100 and the operation unit 150 of an image processing apparatus according to a first exemplary embodiment will be described in detail below with reference to FIG. 1. As apparent from comparison with FIG. 9, the operation unit 150 according to the present exemplary embodiment does not include any hardware keys (numeric keys). Instead, the image processing apparatus according the present exemplary embodiment is configured to perform processing for causing the display device 153 to display software numeric keys. More specifically, graphic data 1002 of the numeric keys is transmitted from the operation unit CPU 151 and combined with graphic data 1003 of a screen transmitted from the main body CPU 101. Then, the composite image is displayed by the display device 153. By performing the above-mentioned processing, the software numeric keys can be displayed on the display device 153 without a great change in the configuration of the main body CPU 101. As described above, the numeric keys include numeric keys from 0 to 9 and symbol keys, such as * and #.

(Hardware Configuration)

Figure 2:
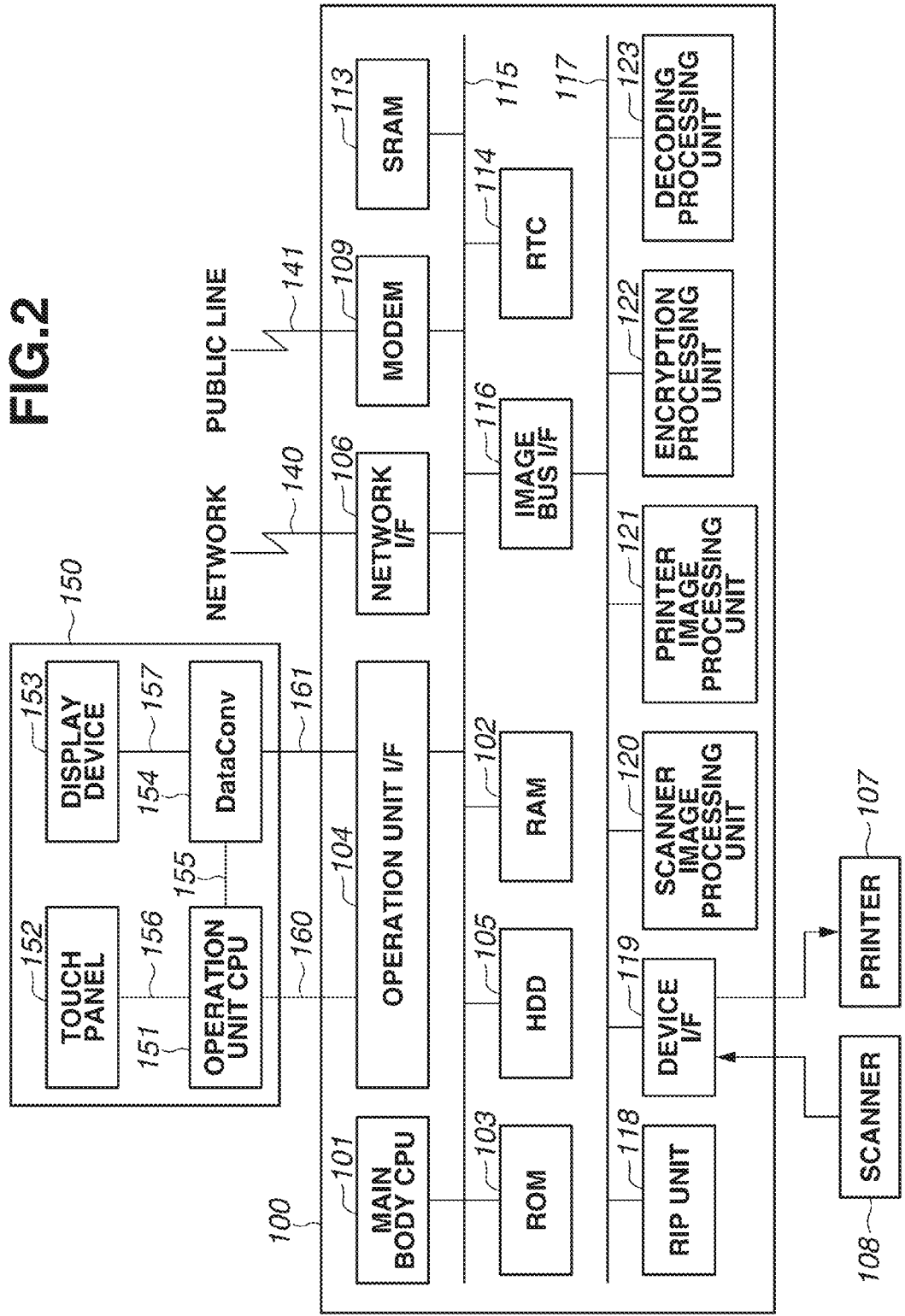
FIG. 2 is a diagram illustrating a hardware configuration that controls each software module of the image processing apparatus.

An example of a hardware configuration that controls each software module of the image processing apparatus will be described in detail below with reference to FIG. 2. The main body controller 100 is connected to a scanner 108 that reads an image on a document and a printer 107 that prints an image on a paper. Further, the main body controller 100 inputs and outputs image information and device information via a network 140 and a public line 141.

The main body CPU 101 is a processor (a control unit) comprehensively controlling various operations to be performed by the image processing apparatus. For example, the main body CPU 101 performs image processing of image data to be printed and performs network control processing. The main body CPU 101 also controls print processing by issuing a print instruction to the printer 107. Further, in response to an instruction from the main body CPU 101, the image processing apparatus can communicate with another PC or a server (i.e., an external device connected to the network) via a network interface (I/F) 106. For example, the image processing apparatus can receive print data from a client PC and can transmit image data, for example, image data read by the scanner and generated, to an external server.

A random access memory (RAM) 102 is functionally operable as a main memory or a work area for the main body CPU 101. The RAM 102 stores setting information about the main body controller 100 and stores a job log and an operation log when each processing has been performed. Further, as described below, the RAM 102 stores graphic data corresponding to a screen to be displayed by the display device 153 of the operation unit 150. A read only memory (ROM) 103 is a boot ROM, which stores a boot program for the system. A hard disk drive (HDD) 105 stores system software programs, applications, and image data.

An operation unit I/F 104 performs various communications to transmit graphic data to the operation unit 150 and receive an input signal from the operation unit 150. Further, the operation unit I/F 104 has a role to transmit information input by a user via the operation unit 150 to the main body CPU 101.

The network I/F 106 is connected to the network 140 and is configured to perform information input/output processing. A modem 109 is connected to the public line 141 and is configured to perform information input/output processing. A static random access memory (SRAM) 113 is a nonvolatile storage medium that can realize high-speed operations. A real-time clock (RTC) 114 continuously counts the time. The above-mentioned devices are connected to a system bus 115.

An image bus I/F 116 is a bus bridge that connects the system bus 115 and an image bus 117 with each other and is configured to convert a data structure. The image bus 117 is constituted by a peripheral component interconnect (PCI) bus or an IEEE1394 bus. The following devices are connected to the image bus 117.

A raster image processor (RIP) unit 118 rasterizes PDL data into a bitmap image. The scanner 108 and the printer 107 are connected to the main body controller 100 via a device I/F 119. The device I/F 119 performs synchronous/asynchronous conversion of image data. A scanner image processing unit 120 performs correction, modification, and editing processing on image data received from the scanner 108. A printer image processing unit 121 performs correction and resolution conversion processing on image data to be output to the printer 107. An encryption processing unit 122 performs encryption processing on input data including image data. A decoding processing unit 123 decodes encrypted data.

The operation unit 150 is connected to the operation unit I/F 104 via buses 160 and 161.

The operation unit CPU 151 is a processor comprehensively controlling various operations to be performed by the operation unit 150. The operation unit 150 includes a ROM that stores programs that enable the operation unit CPU 151 to perform various operations. The programs stored in the ROM of the operation unit 150 include a program required to execute a flowchart illustrated in FIG. 3.

The touch panel 152 is disposed on a surface of the display device 153. The touch panel 152 notifies the operation CPU 151 of positional information (coordinate information) about a portion touched by a user, via a bus 156. The touch panel device can be any one of a resistive membrane type, a capacitance type, or an optical type.

A data converter (DataConv) 154 is a module that receives graphic data from the operation unit I/F 104 of the main body controller 100 via the bus 161 and converts the received graphic data into appropriately formatted data that can be received by the display device 153. For example, the data converter 154 receives DisplayPort data and High-Definition Multimedia Interface (HDMI) (registered trademark) data from the information processing apparatus and converts the received data into a low voltage differential signaling (LVDS) or complementary metal oxide semiconductor (CMOS) formatted signal that can be received by the display device 153.

Further, the data converter 154 is connected to the operation unit CPU 151 via a bus 155. The data converter 154 has a function of superimposing graphic data generated by the operation unit CPU 151 on graphic data transmitted from the main body controller 100 at a predetermined position. As mentioned above, the data converter 154 performs a display control for causing the display device 153 to display a screen.

The display device 153 receives data from the data converter 154 and display image data at predetermined timing.

(Combining Images to be Displayed)

Processing for causing the display device 153 to display software numeric keys will be described in detail below.

The main body CPU 101 of the main body controller 100 generates graphic data 1001 to cause the display device 153 of the operation unit 150 to display a screen and stores the generated graphic data 1001 in the RAM 102. When the generation of graphic data 1001 and the preparation of data transfer completes, the main body CPU 101 causes the operation unit I/F 104 to transfer the graphic data 1001 to the operation unit 150 via the bus 161.

The operation unit CPU 151 of the operation unit 150 generates the graphic data 1002 of the software keys, as graphic data to be combined with the graphic data 1001 transmitted from the main body controller 100. The operation unit CPU 151 transfers the graphic data 1002 and information indicating a superimposing position to the data converter 154 via the bus 155. The data converter 154 generates composite graphic data 1003 by superimposing the graphic data 1002 on the graphic data 1001 transmitted from the main body controller 100, based on the information indicating the superimposing position. The data converter 154 transfers the composite graphic data 1003 to the display device 153 via the bus 157 to cause the display device 153 to perform processing for screen display. The display device 153 displays a screen based on the transferred composite graphic data 1003. Through the above-mentioned processing, the software numeric keys can be displayed on the display device 153 without changing the configuration of the main body controller 100.

The following describes a case where a user has touched a portion where a software numeric key is displayed. According to the above-mentioned conventional technique, in a case where the touch panel 152 is touched, the operation unit CPU 151 transmits information about touched position coordinates to the main body CPU 101. Therefore, if the operation unit CPU 151 performs conventional processing, the information about the touched position coordinates is directly transmitted to the main body CPU 101 even if the portion touched by the user is the display portion of a software numeric key. The display device 153 displays the software numeric keys based on an instruction from the operation unit CPU 151. In other words, the main body CPU 101 does recognize the display of each software numeric key and the display position thereof. Accordingly, even if the main body CPU 101 receives the touched position coordinates from the operation unit CPU 151, the main body CPU 101 cannot discriminate whether a software numeric key has been touched or other portion has been touched. As a result, realizing a screen transition as intended by the user becomes unfeasible.

Therefore, in the following description, an example of processing that is performed by the operation unit CPU 151 to realize the screen transition as indented by each user without a great change in the configuration of the main body controller 100 will be described in detail below.
(Processing to be Performed in Response to Touch Panel Operation)

Figure 3:
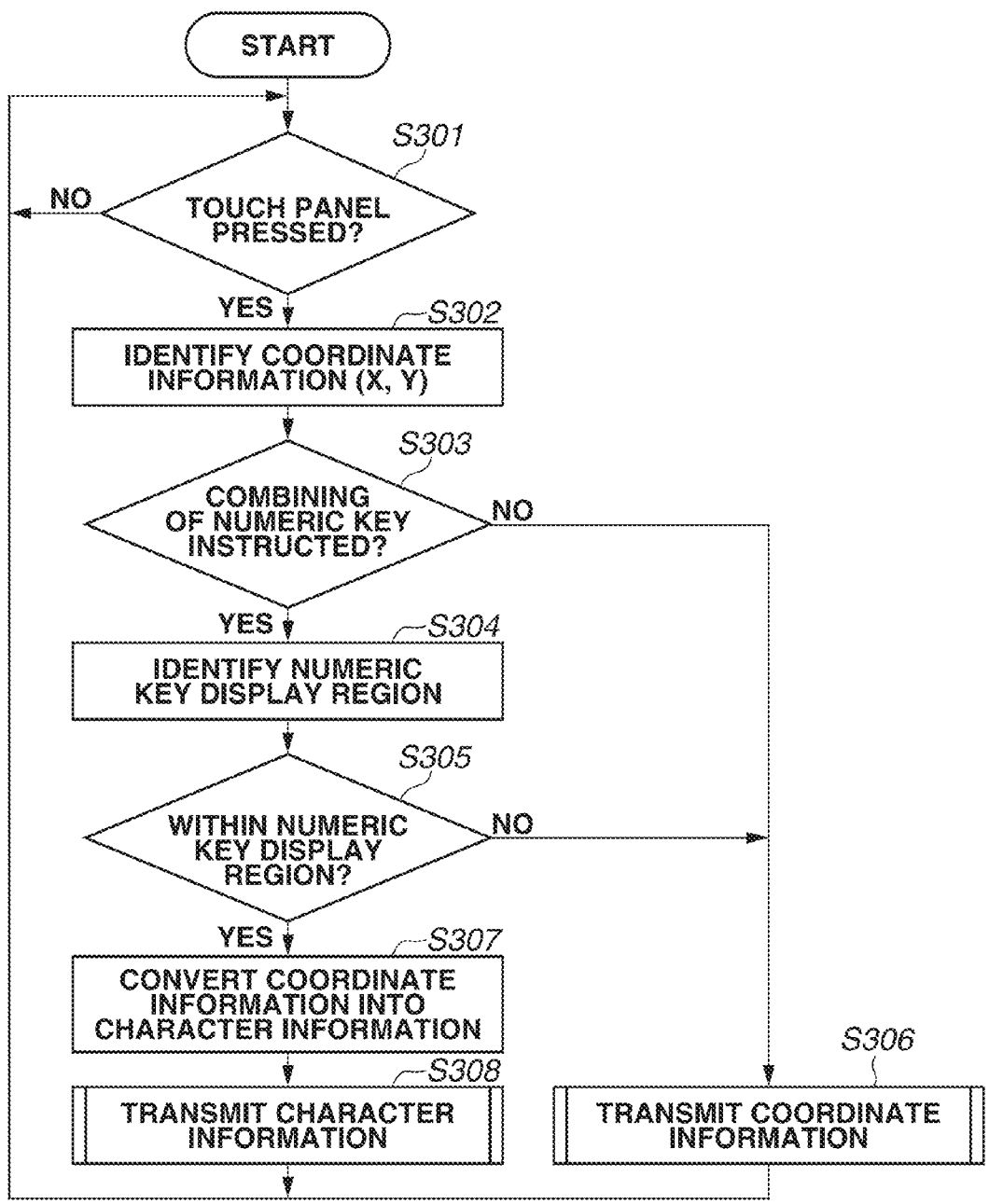
FIG. 3 is a flowchart illustrating processing that is performed by an operation unit CPU in a case where a touch panel is operated.

An example of processing that is performed by the operation unit CPU 151 when the touch panel 152 is operated by a user will be described in detail below with reference to the flowchart illustrated in FIG. 3.

In a case where the operation unit CPU 151 receives an event signal informing that the touch panel 152 has been touched by a user from the touch panel 152 (YES in step S301), then in step S302, the operation unit CPU 151 identifies a touched position (i.e., an operation position).

FIG. 4 illustrates a coordinate system that defines coordinate information about the touch panel 152 and the display device 153, in which a region 401 indicates the whole screen of the display device 153 and a region 402 indicates a partial screen area in which the software numeric keys are displayed.

Figure 5A:
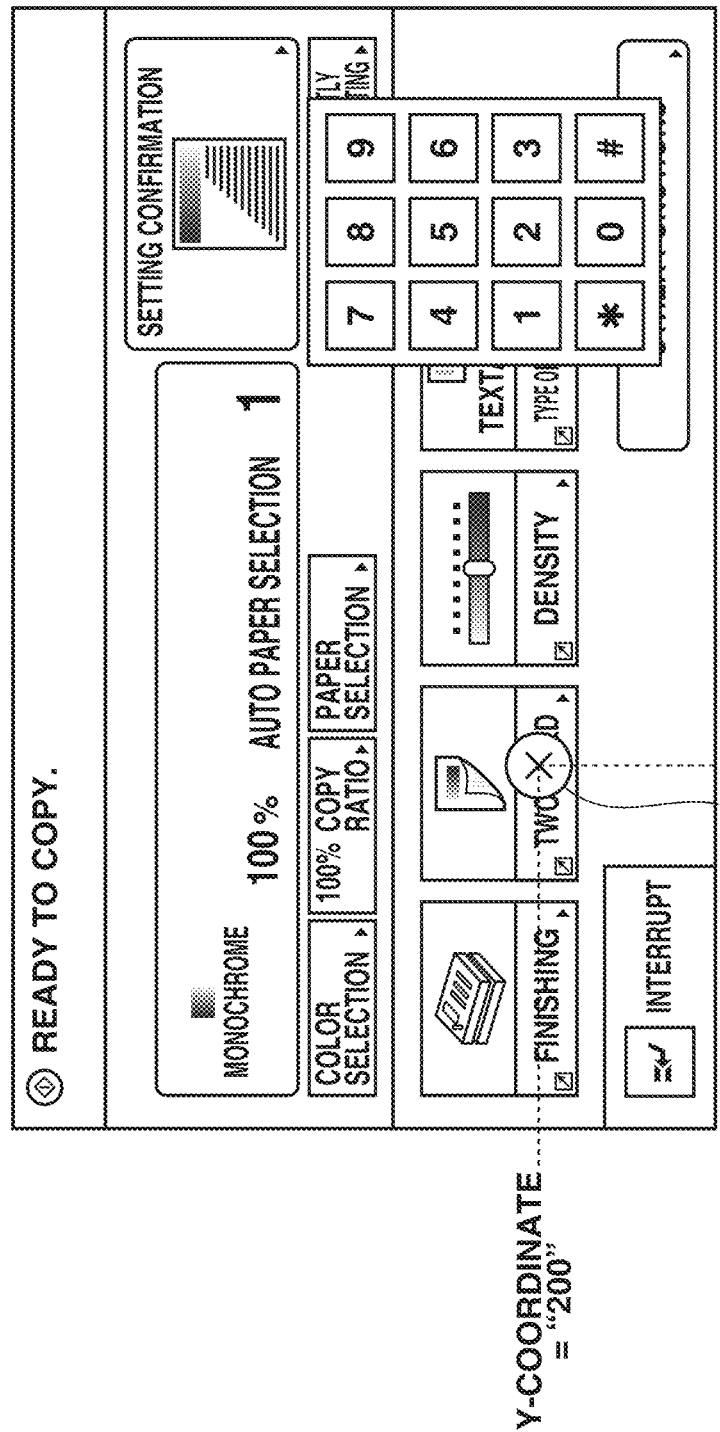
Figure 5B:
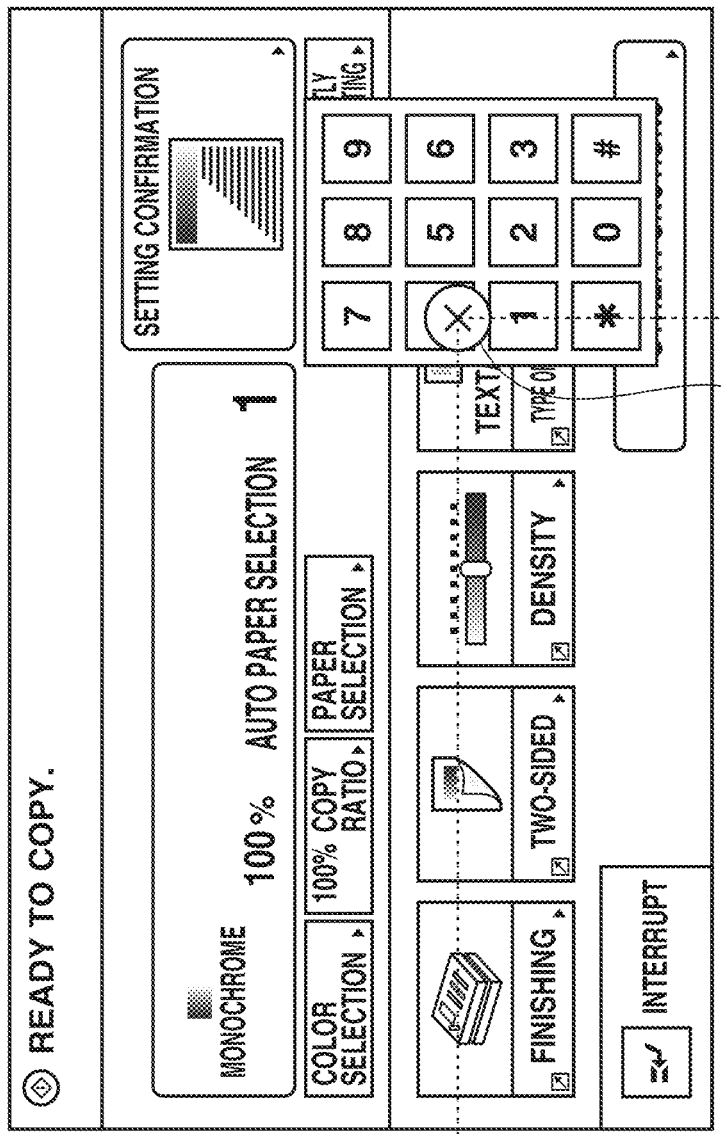

For example, in a case where a screen illustrated in FIG. 5A is touched at a position 501, the operation unit CPU 151 obtains touched position coordinates indicating X-coordinate="400" and Y-coordinate="200." Further, in a case where a screen illustrated in FIG. 5B is touched at a position 502, the operation unit CPU 151 obtains touched position coordinates indicating X-coordinate="750" and Y-coordinate="280."

In step S303, the operation unit CPU 151 determines whether the data converter 154 has received an instruction to combine the graphic data of the software numeric keys with the graphic data of the screen.

In a case where the data converter 154 has not received the graphic data combining instruction (NO in step S303), then in step S306, the operation unit CPU 151 transmits the coordinate information identified in step S302 to the main body controller 100 via the bus 160. For example, in a case where the user touches the screen at a position 503 in a state where the software numeric keys are not displayed as illustrated in FIG. 5C, the operation unit CPU 151 transmits coordinate information indicating X-coordinate="750" and Y-coordinate="280" to the main body CPU 101.

In a case where the data converter 154 has received the graphic data combining instruction (YES in step S303), then in step S304, the operation unit CPU 151 identifies a display region (i.e., a drawing region) of the software numeric keys. In the present exemplary embodiment, as illustrated in FIG. 4, the display region of the software numeric keys is defined as follows.
X-coordinate of Start point: 700
Y-coordinate of Start point: 50
X-coordinate of End point: 1010
Y-coordinate of End point: 360

In step S305, the operation unit CPU 151 determines whether both the X-coordinate and the Y-coordinate of the touched position identified in step S302 are within the display region of the software numeric keys identified in step S304. In a case where it is determined that the coordinates of the identified touched position are outside the display region of the software numeric keys (NO in step S305), then in step S306, the operation unit CPU 151 transmits the coordinate information identified in step S302 to the main body controller 100.

For example, in a case where the screen illustrated in FIG. 5A is touched at the position 501, the operation unit CPU 151 transmits coordinate information indicating X-coordinate="400" and Y-coordinate="200" to the main body CPU 101. As a result, the main body CPU 101 identifies a screen to be used for two-sided print settings as a screen to be next displayed on the display device 153. Then, the main body CPU 101 causes the operation unit I/F 104 to transmit graphic data corresponding to the identified screen to the operation unit 150. The display device 153 displays the two-sided print setting screen based on the received graphic data.

In a case where it is determined that the coordinates of the touched position are within in the display region of the software numeric keys (YES in step S305), then in step S307, the operation unit CPU 151 converts the coordinate information about the touched position into character information (e.g., American Standard Code for Information Interchange (ASCII) character code) corresponding to the key displayed at the touched position. FIG. 6 is a correspondence table illustrating the display position of each character key in relation to corresponding ASCII character code, according to the present exemplary embodiment. The ROM 103 stores the table illustrated in FIG. 6 and the like. The operation unit CPU 151 performs the above-mentioned conversion into the ASCII character code based on the table.

For example, the character information obtained in a case where the screen illustrated in FIG. 5B is touched at the position 502 (X-coordinate="750", Y-coordinate="280"), the ASCII code corresponding to the displayed character "4" is "0x34." Then, in step S308, the operation unit CPU 151 transmits the ASCII character code obtained in step S307 to the main body controller 100. As a result, the main body CPU 101 identifies a screen on which a numerical value "4" is set with respect to the number of copies, as a screen to be next displayed on the display device 153. Then, the main body CPU 101 causes the operation unit I/F 104 to transmit graphic data corresponding to the above-mentioned screen to the operation unit 150. The display device 153 displays the identified screen.

In a case where the touched position is not within any one of the coordinate areas defined by the table illustrated in FIG. 6 even if the touched position is within the display region of the software numeric keys in step S305 (see FIG. 5D), the operation unit CPU 151 can invalidate the instruction input by the user. In this case, the operation unit CPU 151 transmits none of the coordinate information and the character information to the main body CPU 101.

As mentioned above, the image processing apparatus according to the present exemplary embodiment combines the graphic data transmitted from the operation unit CPU 151 with the graphic data transmitted from the main body CPU 101 and causes the display device 153 to display the software numeric keys. Further, in a case where a touch panel is touched, the operation unit CPU 151 determines whether the touched position within the display region of the software numeric keys. Then, the operation unit CPU 151 performs control of whether to transmit coordinate information indicating the touched position to the main body CPU 101 or to transmit character information converted based on the coordinate information to the main body CPU 101 based on a determination result. More specifically, in a case where the touched position is outside the display region of the software numeric the operation unit CPU 151 transmits coordinate information indicating the touched position to the main body CPU 101. Further, in a case where the touched position is within the display region of the software numeric keys, the operation unit CPU 151 transmits character information corresponding to a key displayed at the touched position to the main body CPU 101. Therefore, the image processing apparatus can display software numeric keys without a great change in the configuration of the main body controller 100 and can realize a screen transition corresponding to a software numeric key touched among the displayed software numeric keys. As a result, it becomes feasible to remove the hardware numeric keys from the image processing apparatus and to contribute to cost reduction and design improvement.

Figure 7:
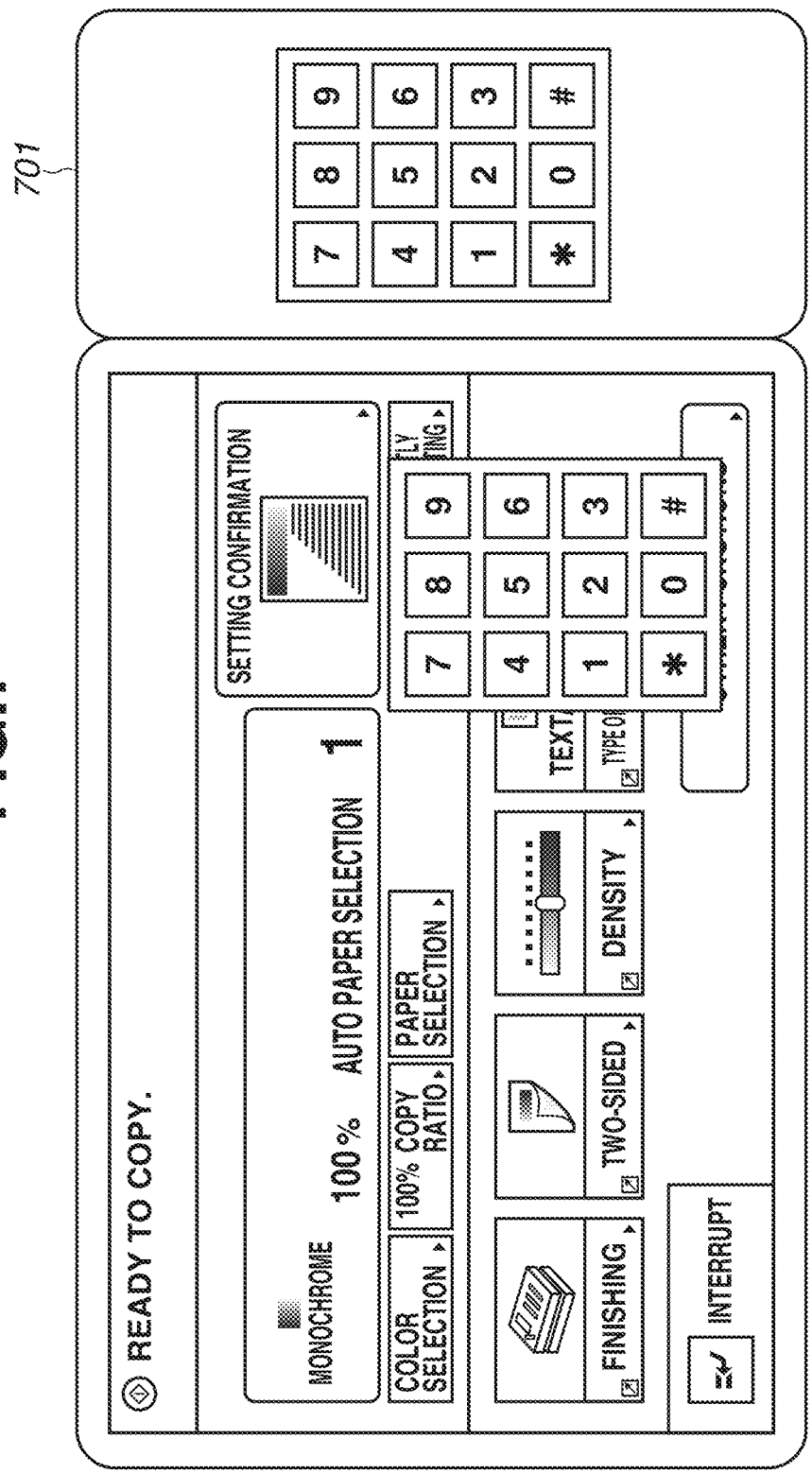
FIG. 7 is a diagram illustrating an appearance of the operation unit and a hardware numeric key pad that are connected to each other.

As described above, the image processing apparatus according to the first exemplary embodiment is configured to enable a user to input an instruction by using software numeric keys while eliminating the hardware numeric keys. On the other hand, to enhance the usability for a user who is familiar to the hardware keys, it will be useful to provide an optional hardware numeric key pad attachable to or detachable from the operation unit. FIG. 7 illustrates an appearance of the operation unit 150 and a hardware numeric key pad 701 that are connected to each other. As illustrated in FIG. 7, even for a case where the hardware numeric key pad 701 is additionally connected to the operation unit 150, if the software numeric keys are displayed on the screen of the operation unit 150, numeric keys are provided in a duplicated manner whereby the user friendliness will deteriorate. Hereinafter, an example of processing that is performed by the operation unit CPU 151 according to a second exemplary embodiment, in a case where the hardware numeric key pad 701 is connected to the operation unit 150, will be described in detail below.

Figure 8:
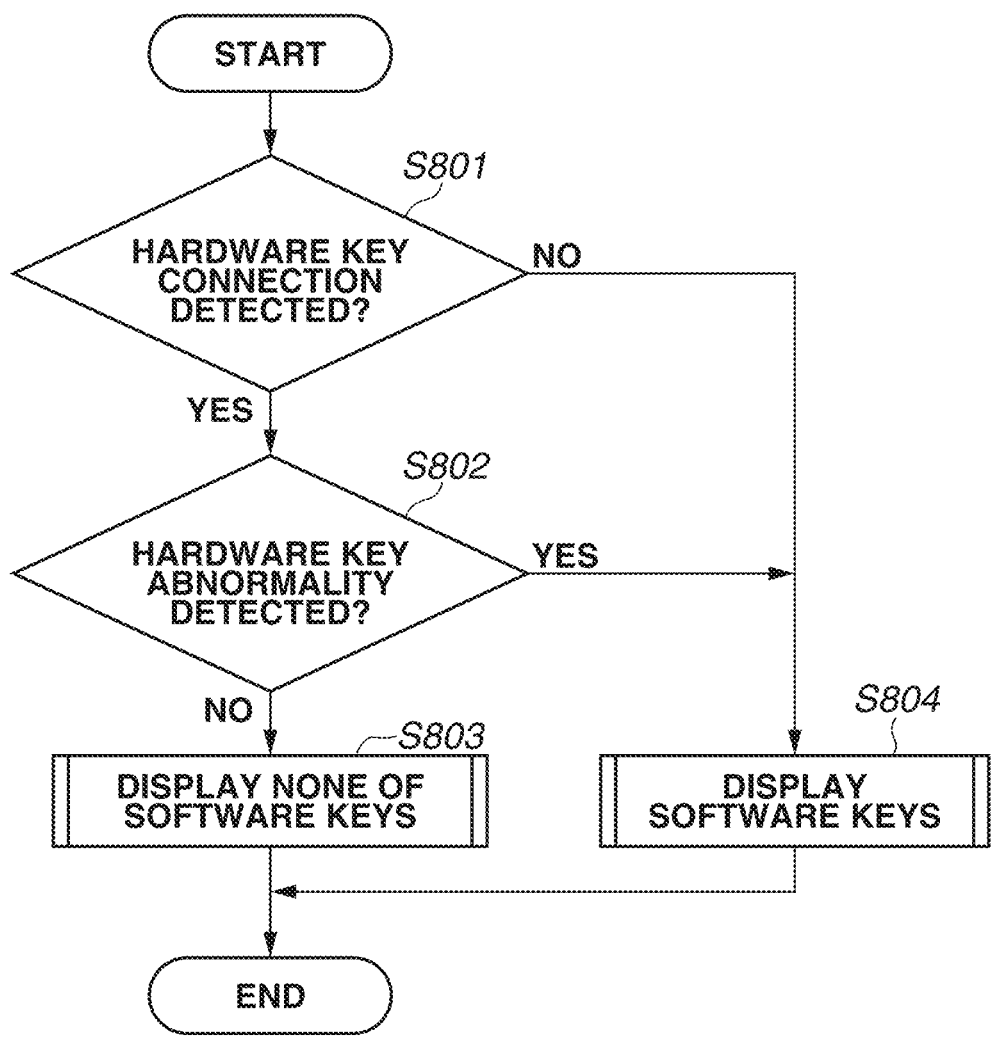
FIG. 8 is a flowchart illustrating processing that is performed by the operation unit CPU.

FIG. 8 is a flowchart illustrating processing that is performed by the operation unit CPU 151 according to the second exemplary embodiment.

In step S801, the operation unit CPU 151 confirms whether a connection of the hardware numeric key pad 701 has been detected. In a case where the connection of the hardware numeric key pad 701 has not been detected (NO in step S801), then in step S804, the operation unit CPU 151 performs processing for causing the display device 153 to display the software numeric keys, which is similar to that described in the first exemplary embodiment.

In a case where the connection of the hardware numeric key pad 701 has been detected (YES in step S801), then in step S802, the operation unit CPU 151 checks whether an abnormality of the hardware numeric key pad 701 has been detected. The following is some examples of the abnormality occurring in the hardware numeric key pad 701.

More than the predetermined number of key pressing events (chattering) have been detected within a predetermined time period.

A key pressing event continuing for a predetermined time period has been detected.

The total number of key pressing events having been detected exceeds a predetermined threshold value.

The use period of the hardware numeric key pad exceeds a product life (e.g., five years).

In a case where the abnormality of the hardware numeric key pad 701 has not been detected (NO in step S802), then in step S803, the operation unit CPU 151 does not cause the display device 153 to display the software numeric keys. In this case, the operation unit CPU 151 does not transmit the instruction to combine the graphic data 1002 corresponding to the software numeric keys to the data converter 154. When a hardware numeric key is pressed by a user, the operation unit CPU 151 transmits character information corresponding to the pressed key to the main body CPU 101, as described in the conventional technique.

In a case where the abnormality of the hardware numeric key pad 701 has been detected (YES in step S802), the operation proceeds to step S804. In step S804, the operation unit CPU 151 performs processing similar to that described in the first exemplary embodiment.

As mentioned above, the information processing apparatus according to the present exemplary embodiment does not display the software numeric keys in a case where the hardware numeric key pad 701 is already connected to the operation unit 150 and can be used normally. Therefore, it becomes feasible to avoid displaying the software numeric keys in a duplicate manner when the hardware numeric key pad 701 is available. Further, in a case where the functions of the hardware numeric key pad 701 cannot be effectively used due to abnormality even in the state where the hardware numeric key pad 701 is connected to the operation unit 150, the information processing apparatus enables a user to perform an input operation by using the software numeric keys. Thus, the user friendliness can be prevented from being worsened greatly.

If desired, the processing in step S802 can be omitted. More specifically, the information processing apparatus can be configured to switch the display of the software numeric keys considering the connection state of the hardware numeric key pad 701.

Although the present invention has been described with reference to some preferred exemplary embodiments, the present invention is not limited to the above-mentioned specific exemplary embodiments. The present invention encompasses other embodiments variously modified without departing from the scope of the invention. Further, the above-mentioned exemplary embodiments can be appropriately combined at least partly.

As mentioned above, the image forming apparatus according to the above-mentioned exemplary embodiment has a plurality of functions (e.g., copy and scanner functions). However, the present invention can be also applied to an image processing apparatus that has only a part of the above-mentioned functions. Further, the present invention can be applied to any other information processing apparatus, such as a personal computer, a personal digital assistant (PDA), a portable telephone, a facsimile machine, a still camera, a video camera, or an image viewer.

Further, the image forming apparatus according to the above-mentioned exemplary embodiment is configured to display the software numeric keys in place of the hardware numeric keys. However, any other hardware keys may be in place of the hardware numeric keys.

As described above, the information processing apparatus according to the above-mentioned exemplary embodiment can display the software keys on an intended screen of the display device without a great change in the configuration of the main body controller that controls the information processing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-088800, filed Apr. 23, 2015, which is hereby incorporated by reference herein in its entirety.

What is claimed is:

1. An information processing apparatus comprising:
an operation device equipped with a display device;
a first control unit configured to control an operation of the information processing apparatus and generate first graphic data corresponding to a screen to be displayed by the display device;
a second control unit configured to control an operation of the operation device and generate second graphic data corresponding to a software key; and
a display control unit configured to display, in the same screen on the display device, a display according to the first graphic data generated by the first control unit and a display according to the second graphic data generated by the second control unit; and
an identifying unit configured to identify an operation position where a user operates on the operation device, and
a determination unit configured to determine whether the operation position identified by the identifying unit is in a display region of the display according to the second graphic data,
wherein, based on a determination result obtained by the determination unit, the second control unit transmits, to the first control unit, either positional information indicating the operation position or character information corresponding to a key displayed at the operation position, the key being one of a plurality of keys included in the software key, and
wherein the first control unit, the second control unit, the display control unit, the identifying unit, and the determination unit are implemented using at least one hardware processor.

2. The information processing apparatus according to claim 1, wherein the second control unit transmits information indicating a display position of the second graphic data together with the second graphic data, and
wherein the display control unit displays, in the same screen on the display device, the display according to the first graphic data generated by the first control unit and a display according to the second graphic data generated by the second control unit, based on information indicating the display position transmitted by the second control unit.

3. The information processing apparatus according to claim 1, wherein
the determination unit is configured to determine whether the operation position identified by the identifying unit is within the display region of the second graphic data.

4. The information processing apparatus according to claim 1, wherein the second control unit transmits, in a case where the determination unit determines that the operation position is in the display region of the second graphic data, character information corresponding to a key displayed at the operation position to the first control unit, and transmits, in a case where the determination unit determines that the operation position is outside the display region of the second graphic data, the positional information to the first control unit.

5. The information processing apparatus according to claim 4, further comprising:
a storage unit implemented using at least one non-transitory storage medium and configured to store display positions of the plurality of keys included in the software key and pieces of character information corresponding to the respective plurality of keys in such a manner that each of the display positions is associated with a corresponding piece of the character information, wherein the second control unit identifies, in a case where the determination unit determines that the operation position is within the display region of the second graphic data, character information corresponding to a key displayed at the operation position based on the information stored in the storage unit and transmits the identified character information to the first control unit.

6. The information processing apparatus according to claim 1, wherein the character information is ASCII character code.

7. The information processing apparatus according to claim 1, wherein the operation device includes a touch panel, and wherein the identifying unit identifies coordinates of a position touched by a user on the touch panel.

8. The information processing apparatus according to claim 1, wherein the software key is a software key corresponding to numeric keys which is to be used for inputting characters including numerals.

9. The information processing apparatus according to claim 1, further comprising a reading unit implemented using at least one scanner and configured to read an image on a document.

10. The information processing apparatus according to claim 1, further comprising a printing unit implemented using at least one printer and configured to print an image on a paper.

11. A control method performed by an information processing apparatus that includes a first control unit configured to control an operation of the information processing apparatus and a second control unit configured to control an operation of an operation device equipped with a display device, the control method comprising:

causing the first control unit to generate first graphic data corresponding to a screen to be displayed by the display device;

causing the second control unit to generate second graphic data corresponding to a software key;

displaying, in the same screen on the display device, a display according to the first graphic data generated by the first control unit and a display according to the second graphic data generated by the second control unit;

identifying an operation position where a user operates on the operation device, and determining whether the operation position identified by the identifying is in a display region of the display according to the second graphic data, wherein, based on a determination result obtained by the determining, the second control unit transmits, to the first control unit, either positional information indicating the operation position or character information corresponding to a key displayed at the operation position, the key being one of a plurality of keys included in the software key.

12. A non-transitory computer-readable storage medium storing a computer program that causes a computer to execute a control method performed by an information processing apparatus that includes a first control unit configured to control an operation of the information processing apparatus and a second control unit configured to control an operation of an operation device equipped with a display device, wherein the first control unit and the second control unit are implemented using at least one hardware processor; the control method comprising:

causing the first control unit to generate first graphic data corresponding to a screen to be displayed by the display device;

causing the second control unit to generate second graphic data corresponding to a software key;

displaying, in the same screen on the display device, a display according to the first graphic data generated by the first control unit and a display according to the second graphic data generated by the second control unit;

identifying an operation position where a user operates on the operation device, and determining whether the operation position identified by the identifying is in a display region of the display according to the second graphic data, wherein, based on a determination result obtained by the determining, the second control unit transmits, to the first control unit, either positional information indicating the operation position or character information corresponding to a key displayed at the operation position, the key being one of a plurality of keys included in the software key.

* * * * *